(12) United States Patent
Saito et al.

(10) Patent No.: US 6,469,217 B2
(45) Date of Patent: Oct. 22, 2002

(54) PROCESS FOR PREPARING FLUOROPOLYMER

(75) Inventors: Satoru Saito, Kitaibaraki; Haruyoshi Tatsu, Hitachi, both of (JP); Vera Grinevskaya, Moscow (RU)

(73) Assignee: Nippon Mektron, Ltd., Tokyo (JP)

( * ) Notice: Subject to any disclaimer, the term of this patent is extended or adjusted under 35 U.S.C. 154(b) by 0 days.

(21) Appl. No.: 09/845,888

(22) Filed: Apr. 30, 2001

(65) Prior Publication Data

US 2001/0050351 A1 Dec. 13, 2001

(30) Foreign Application Priority Data

May 1, 2000 (JP) ........................................ 2000-132590
Jul. 28, 2000 (JP) ........................................ 2000-229585

(51) Int. Cl.$^7$ .............................................. C07C 43/11
(52) U.S. Cl. ...................................................... 568/615
(58) Field of Search .......................... 568/615; 560/180, 560/184, 185, 186; 502/151, 171; 528/401, 402, 488, 491

(56) References Cited

U.S. PATENT DOCUMENTS 3,660,315 A * 5/1972 Hill et al. ..................... 260/2
6,127,517 A * 10/2000 Koike et al. ................ 528/402

* cited by examiner

*Primary Examiner*—Rosalynd Keys
(74) *Attorney, Agent, or Firm*—Webb Ziesenheim Logsdon Orkin & Hanson, P.C.

(57) ABSTRACT

The polymerization initiator-containing solution obtained by mixing a specific perfluorodicarboxylic acid fluoride (A) with CsF in an aprotic polar solvent with stirring to conduct reaction and thereby form a polymerization initiator (B) and then allowing the reaction solution to stand for not less than 72 hours at a temperature of 0 to 30° C. A polymerization initiator-containing solution comprises a specific polymerization initiator (B') and an aprotic polar solvent. The process for preparing a perfluoropolyether comprises polymerizing hexafluoropropylene oxide in the presence of the polymerization initiator-containing solution.

17 Claims, 1 Drawing Sheet

(a)

(b)

(c)

(d)

PROCESS FOR PREPARING FLUOROPOLYMER

FIELD OF THE INVENTION

The present invention relates to a process for preparing a fluoropolymer and a solution catalyst capable of providing a fluoropolymer. More particularly, the invention relates to a process for preparing a perfluoropolyether, comprising polymerizing hexafluoropropylene oxide in a special polymerization initiator-containing solution.

BACKGROUND OF THE INVENTION

Bifunctional perfluoropolyether oligomers can undergo crosslinking reaction or can be made to have high molecular weight by taking advantage of functional groups present at both ends, and therefore they are useful as resins for sealants, adhesives and vulcanized rubber molded articles having excellent solvent resistance and chemical resistance. The bifunctional perfluoropolyethers can be favorably used as resins which are used for, for example, molded articles, such as O-ring, gasket, diaphragm and tube, sealing agents of chemical plant pipes, sealing agents of tank flanges, and adhesives.

It has been heretofore known that the bifunctional perfluoropolyether (sometimes referred to as "PFE" hereinafter) is prepared by polymerizing hexafluoropropylene oxide (sometimes referred to as "HFPO" hereinafter) in the presence of an appropriate catalyst or polymerization initiator.

In the polymerization of HFPO, chain transfer caused by compounds other than the polymerization initiator, e.g., chemical species such as $H_2O$, HF and a carbonyl group, is very liable to take place, so that it is important to eliminate inclusion of the chemical species other than the polymerization initiator to the utmost thereby to inhibit polymerization initiation from such chemical species and to conduct polymerization reaction under the conditions where formation of by-products such as compounds other than the intended bifunctional perfluoropolyether can be inhibited. In particular, $H_2O$ is present anywhere, e.g., in air, and there is a high possibility of inclusion of $H_2O$ into the polymerization system. Hence, it is very important to eliminate inclusion of $H_2O$.

It is known that in order to enhance selectivity of the bifunctional perfluoropolyether, the polymerization reaction needs to be promoted with maintaining the polymerization temperature of HFPO as low as possible. It is also known that lowering of the polymerization temperature in the polymerization of HFPO not only inhibits chain transfer but also enhances selectivity of the reaction and degree of polymerization of the resulting polymer. Further, it is also known that use of the bifunctional initiator as the polymerization initiator reduces formation of a monofunctional polymer (by-product).

In "J. MACROMOL. SCI. —CHEM.", 48(3), 499–520 (1974), there is described a process wherein hexafluoropropene (sometimes referred to as "HFP" hereinafter) is allowed to be present during the polymerization of HFPO to inhibit chain transfer and to increase degree of polymerization of the resulting polymer.

In U.S. Pat. No. 3,660,315 and Japanese Patent Publication No. 5360/1978, there is described a process for preparing a bifunctional perfluoropolyether, comprising mixing cesium fluoride, tetraglyme and $FOCCF(CF_3)$ $OCF_2CF_2OCF(CF_3)COF$ with one another and allowing HFPO to react, at a low temperature, with a compound of the following formula contained in the resulting homogenous solution from which extra cesium fluoride has been separated.

The present inventors have made an attempt to synthesize a compound represented by the above formula and to prepare a bifunctional perfluoropolyether from HFPO in the presence of the resulting compound, in accordance with the process described in U.S. Pat. No. 3,660,315 and Japanese Patent Publication No. 5360/1978. As shown in Comparative Example 1 or 2 in this specification, however, when the degree of aging of the catalyst or the concentration of the catalyst is out of a certain range, the degree of polymerization and the selectivity of the bifunctional perfluoropolyether are lowered, resulting in lack of utility.

In Japanese Patent Laid-Open Publication No. 101788/1998, there is described a process for preparing a bifunctional polyether, wherein in order to increase selectivity of the reaction, heat of polymerization is removed from the highly viscous HFPO polymerization system to lower the polymerization temperature, and in order to inhibit chain transfer, a liquefied gas of fluorocarbon of 1 to 4 carbon atoms is added to the reaction system and HFPO is polymerized with evaporating the liquefied gas from the polymerization system. In this process, however, absence of extra HFPO is necessary for inhibition of side reaction such as formation of a monofunctional product, and it is sometimes difficult to control the reaction.

It is difficult to completely remove a chain transfer-causing compound, such as $H_2O$, HF or a carbonyl group-containing compound, from HFPO that is a starting material of a perfluoropolyether. Accordingly, there has been desired development of a process for preparing a bifunctional perfluoropolyether wherein even if such a chain transfer-causing compound is present in a trace amount, a bifunctional perfluoropolyether can be readily obtained with high degree of polymerization and high selectivity.

Under such circumstances, the present inventors have earnestly studied in order to solve the above problems. As a result, they have found that when a polymerization initiator-containing solution having been subjected to a certain treatment is used as a polymerization catalyst, a bifunctional perfluoropolyether can be obtained with high degree of polymerization and high selectivity. The present inventors have also found that this polymerization initiator-containing solution is in a liquid state even at low temperatures. Based on the finding, the first invention has been accomplished.

Moreover, the present inventors have found that when a polymerization initiator-containing solution which contains no free $Cs^+F^-$ is used as a polymerization catalyst, a bifunctional perfluoropolyether can be obtained with high degree of polymerization and high selectivity. The present inventors have also found that this polymerization initiator-containing solution is in a liquid state even at low temperatures. Based on the finding, the second invention has been accomplished.

It is an object of the present invention to provide a convenient process for preparing a bifunctional perfluoropolyether with high degree of polymerization and high selectivity. In particular, it is an object of the first invention to provide a solution catalyst which serves as a polymerization catalyst, can be in a liquid state even at a low temperature during the polymerization reaction, can be homogeneously dispersed in the polymerization reaction system and exhibits low chain transfer property and high activity.

SUMMARY OF THE INVENTION

The summary of the present invention is described below.

The polymerization initiator-containing solution according to the invention is a polymerization initiator-containing solution capable of being obtained by mixing a perfluorodicarboxylic acid fluoride (A) represented by the following formula (I) with CsF in an aprotic polar solvent with stirring to conduct reaction and thereby form a polymerization initiator (B) and then allowing the reaction solution to stand for not less than 72 hours at a temperature of 0 to 30° C.;

FOC—Rf—COF  (I)

wherein Rf is a perfluoroalkylene group having 1 to 4 carbon atoms or a perfluoroalkylene group having 2 to 10 carbon atoms and an ether bond.

The process for preparing a polymerization initiator-containing solution according to the invention comprises mixing a perfluorodicarboxylic acid fluoride (A) represented by the following formula (I) with CsF in an aprotic polar solvent with stirring to conduct reaction and thereby form a polymerization initiator (B) and then allowing the reaction solution to stand for not less than 72 hours at a temperature of 0 to 30° C.;

FOC—Rf—COF  (I)

wherein Rf is a perfluoroalkylene group having 1 to 4 carbon atoms or a perfluoroalkylene group having 2 to 10 carbon atoms and an ether bond.

The process for preparing a perfluoropolyether according to the invention comprises polymerizing hexafluoropropylene oxide in the presence of the above-mentioned polymerization initiator-containing solution.

The polymerization initiator (B) contained in the polymerization initiator-containing solution is preferably a compound represented by the following formula (II):

CsOCF$_2$—Rf—CF$_2$OCs  (II)

wherein Rf is a perfluoroalkylene group having 1 to 4 carbon atoms or a perfluoroalkylene group having 2 to 10 carbon atoms and an ether bond.

The concentration of the polymerization initiator (B) in the polymerization initiator-containing solution is preferably not less than $4\times10^{-4}$ mol/g.

The polymerization of the hexafluoropropylene oxide is preferably carried out at a temperature of not higher than −30° C.

In the polymerization of the hexafluoropropylene oxide, it is preferable to further use hexafluoropropylene in combination in an amount of 20 to 50% by weight based on the amount of the hexafluoropropylene oxide.

The perfluorodicarboxylic acid fluoride (A) is preferably represented by the following formula (III):

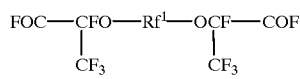

(III)

wherein Rf$^1$ is a perfluoroalkylene group having 2 to 4 carbon atoms.

The aprotic polar solvent is preferably diglyme, triglyme, tetraglyme or sulfolane.

The process for preparing a perfluoropolyether according to the invention comprises polymerizing hexafluoropropylene oxide in the presence of a polymerization initiator-containing solution which comprises a polymerization initiator (B') represented by the following formula (IV) and an aprotic polar solvent;

(FOC)$_x$—Rf$^2$—(CF$_2$OCs)$_y$  (IV)

wherein Rf$^2$ is perfluoroalkylene having 1 to 4 carbon atoms or perfluoroalkylene having 2 to 10 carbon atoms and an ether bond, and x and y are numbers satisfying the conditions of x+y=2 and 0.1<y<2.

Rf$^2$ in the formula (IV) is preferably represented by the following formula (V):

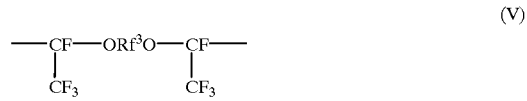

(V)

wherein Rf$^3$ is perfluoroalkylene having 2 to 6 carbon atoms.

The polymerization of the hexafluoropropylene oxide is preferably carried out at a temperature of not higher than −30° C.

The concentration of the polymerization initiator (B') in the polymerization initiator-containing solution is preferably not less than $4\times10^{-4}$ mol/g.

In the polymerization of the hexafluoropropylene oxide, hexafluoropropylene can be further used in combination in an amount of 20 to 50% by weight based on the amount of the hexafluoropropylene oxide.

The polymerization initiator (B') is preferably a compound obtained by allowing a perfluorodicarboxylic acid fluoride (A') represented by the following formula (VI) to react with CsF in an aprotic polar solvent;

FOC—Rf$^4$—COF  (VI)

wherein Rf$^4$ is a perfluoroalkylene group having 1 to 4 carbon atoms or a perfluoroalkylene group having 2 to 10 carbon atoms and an ether bond.

The perfluorodicarboxylic acid fluoride (A') is preferably represented by the following formula (VII):

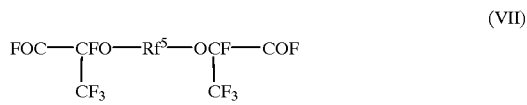

(VII)

wherein Rf$^5$ is a perfluoroalkylene group having 2 to 4 carbon atoms.

The molar ratio (CsF/perfluorodicarboxylic acid fluoride (A')) of the CsF to the perfluorodicarboxylic acid fluoride (A') used is preferably not less than 0.1 and less than 2.

The aprotic polar solvent is preferably diglyme, triglyme, tetraglyme or sulfolane.

FOC—Rf—COF    (I)

Figure 1:
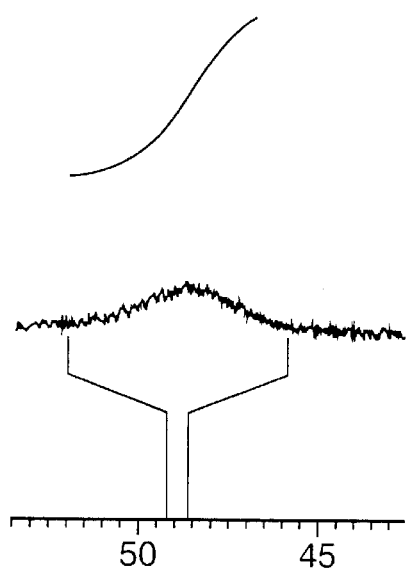
FIGS. 1(a)–1(d) show changes in a $^{19}$F-NMR spectrum of a fluorine atom of —CF$_2$OCs at the end of a polymerization initiator (B) and an integral value of the fluorine atom with time, said polymerization initiator (B) being represented by the following formula (II) and obtained by mixing a perfluorodicarboxylic acid fluoride (A) represented by the following formula (I) with CsF in an aprotic polar solvent with stirring.
Figure 1:
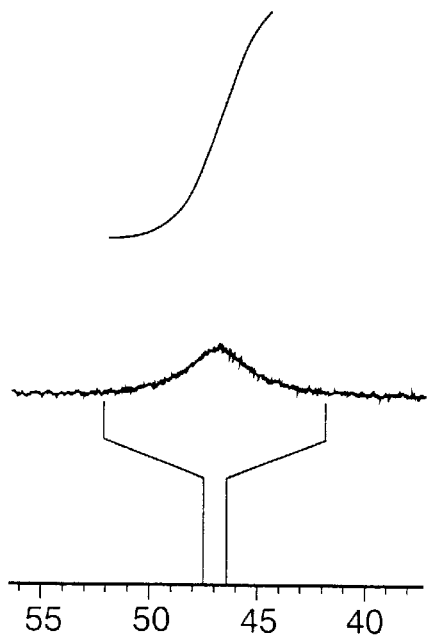
Figure 1:
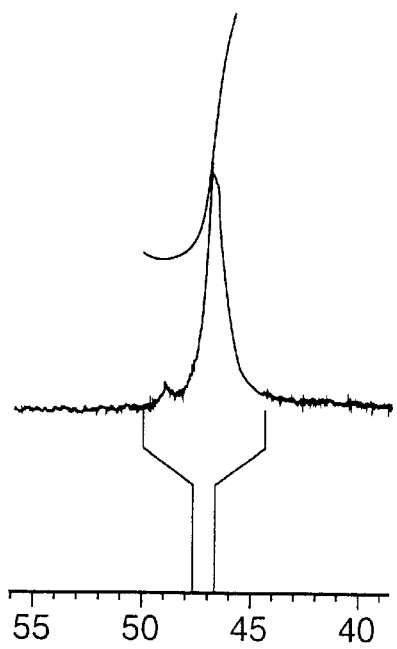
Figure 1:
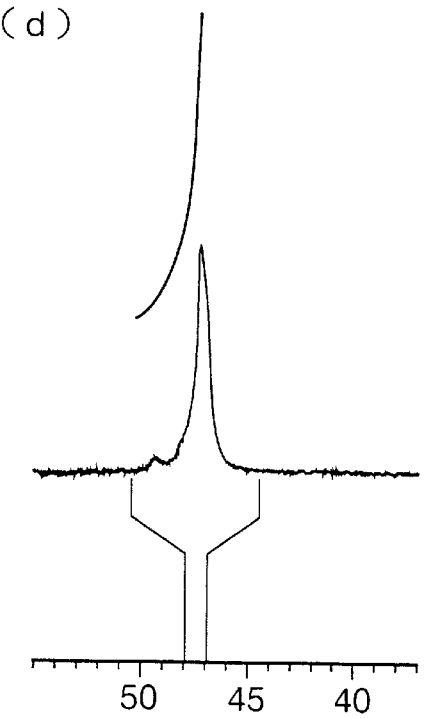

wherein Rf is a perfluoroalkylene group having 1 to 4 carbon atoms or a perfluoroalkylene group having 2 to 10 carbon atoms and an ether bond;

CsOCF$_2$—Rf—CF$_2$OCs    (II)

wherein Rf is the same as Rf in the formula (I)

FIGS. 1(a), 1(b), 1(c) and 1(d) show $^{19}$F-NMR spectra and integral values of the above fluorine atom measured after a lapse of 24 hours, 48 hours, 96 hours and 30 days, respectively, from disappearance of the starting compound represented by the formula (I).

DETAILED DESCRIPTION OF THE INVENTION

The present invention is described in detail hereinafter.

In the process for preparing a perfluoropolyether according to the invention, hexafluoropropylene oxide is polymerized in the presence of a special polymerization initiator-containing solution to prepare a perfluoropolyether. First, the polymerization initiator-containing solution is described.

Polymerization Initiator-containing Solution

The polymerization initiator-containing solution of the first invention and the polymerization initiator-containing solution of the second invention are described below.

The polymerization initiator-containing solution of the first invention is a solution catalyst which can be obtained by mixing a perfluorodicarboxylic acid fluoride (A) represented by the following formula (I) with CsF in an aprotic polar solvent with stirring to conduct reaction and thereby form a polymerization initiator (B) and then allowing the reaction solution to stand for not less than 72 hours at a temperature of 0 to 30° C.;

FOC—Rf—COF    (I)

wherein Rf is a perfluoroalkylene group having 1 to 4 carbon atoms or a perfluoroalkylene group having 2 to 10 carbon atoms and an ether bond.

In the formula (I), Rf is a perfluoroalkylene group having 1 to 4 carbon atoms or a perfluoroalkylene group having 2 to 10 carbon atoms and an ether bond. Examples of Rf include groups represented by the following formulas:

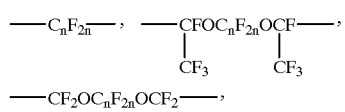

wherein n is an integer of 1 to 6.

Of these, a group represented by the following formula is preferable in the first invention.

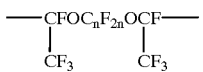

Of the perfluorodicarboxylic acid fluorides having such groups, particularly preferably used in the first invention is a perfluorodicarboxylic acid fluoride wherein n in the above group is an integer of 2 to 4, namely, a perfluorodicarboxylic acid fluoride represented by the following formula (III):

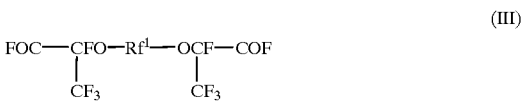

wherein Rf$^1$ is a perfluoroalkylene group having 2 to 4 carbon atoms.

The polymerization initiator-containing solution of the second invention is a solution catalyst obtained by mixing a perfluorodicarboxylic acid fluoride (A') represented by the following formula (VI) with CsF in a mixing ratio by mol of 1:0.1 to less than 2.0 (perfluorodicarboxylic acid fluoride:CsF) in an aprotic polar solvent with stirring to conduct reaction and thereby form a polymerization initiator (B') represented by the following formula (IV);

FOC—Rf$^4$—COF    (VI)

wherein Rf$^4$ is a perfluoroalkylene group having 1 to 4 carbon atoms or a perfluoroalkylene group having 2 to 10 carbon atoms and an ether bond;

(FOC)$_x$—Rf$^2$—(CF$_2$OCs)$_y$    (IV)

wherein Rf$^2$ is perfluoroalkylene having 1 to 4 carbon atoms or perfluoroalkylene having 2 to 10 carbon atoms and an ether bond, and x and y are numbers satisfying the conditions of x+y=2 and 0.1<y<2.

In the present specification, the polymerization initiator represented by the formula (IV) is a mixture of two kinds of polymerization initiators represented by the following formulas (IV-1) and (IV-2):

(CF$_2$OCs)—Rf$^2$—(CF$_2$OCs)    (IV-1)

(FOC)—Rf$^2$—(CF$_2$OCs)    (IV-2)

wherein Rf$^2$ is perfluoroalkylene having 1 to 4 carbon atoms or perfluoroalkylene having 2 to 10 carbon atoms and an ether bond.

x and y in the formula (IV) indicate proportions of two kinds of functional groups (—CF$_2$OCs and —COF) present in the whole polymerization initiator, said proportions corresponding to mixing proportions of the polymerization initiators represented by the formulas (IV-1) and (IV-2) The perfluorodicarboxylic acid fluoride (A') for use in the second invention is represented by the formula (VI), and Rf$^4$ in the formula (VI) is a perfluoroalkylene group having 1 to 4 carbon atoms or a perfluoroalkylene group having 2 to 10 carbon atoms and an ether bond.

Examples of Rf$^4$ include groups represented by the following formulas:

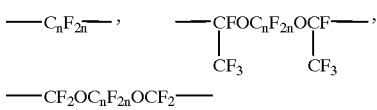

wherein n is an integer of 1 to 6.

Of these, a group represented by the following formula is preferable in the second solution.

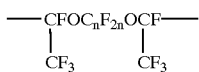

Of the perfluorodicarboxylic acid fluorides having such groups, particularly preferably used in this invention is a perfluorodicarboxylic acid fluoride wherein n in the above group is an integer of 2 to 4, namely, a perfluorodicarboxylic acid fluoride represented by the following formula (VII):

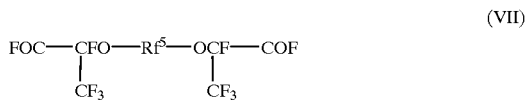 (VII)

wherein $Rf^5$ is a perfluoroalkylene group having 2 to 4 carbon atoms.

The aprotic polar solvent for use in the first and the second inventions is preferably one having a large dielectric constant $\epsilon$ and no proton-donative group. For example, preferable is an aprotic polar solvent exhibiting marked interaction to the ionic reaction active species, because it generally is rich in the association properties and has large proton variable capacity, and therefore if it is used as a solvent for organic ionic reaction, its self association is loosened to form a more stable salvation state.

Examples of the aprotic polar solvents include N,N-dimethylformamide, N,N-dimethylacetamide, tetramethylurea, dimethyl sulfoxide, hexamethylphosphoramide, acetonitrile, tetramethylene sulfone (sulfolane), propylene carbonate, nitrobenzene, nitromethane, dimethyl cyanamide, tetrahydrofuran, dioxane and pyridine.

A hydrocarbon compound having at least one ether bond, preferably 1 to 3 ether bonds, in a molecule can also be preferably used, and examples of such compounds include ethyl methyl ether, diethyl ether, monoglyme (ethylene glycol dimethyl ether), diglyme (diethylene glycol dimethyl ether) and tetrahydrofuran.

Also employable is a chain or cyclic hydrocarbon compound having 5 or more ether bonds in a molecule, such as tetraglyme (tetraethylene glycol dimethyl ether) or crown ether (15-crown-5, 18-crown-6).

Of the above compounds, monoglyme, diglyme, tetraglyme or sulfolane is preferably used in the invention, and tetraglyme is more preferably used in the invention.

Next, the process for preparing a polymerization initiator-containing solution according to the invention is described.

Process for Preparing Polymerization Initiator-containing Solution of the First Invention The polymerization initiator-containing solution of the first invention can be obtained by mixing the perfluorodicarboxylic acid fluoride (A), cesium fluoride (CsF) and the aprotic polar solvent with one another with stirring to conduct reaction and thereby form a polymerization initiator (B) and then allowing the reaction solution to stand (aging the solution) for not less than 72 hours, preferably not less than 84 hours, more preferably not less than 96 hours, at a temperature of 0 to 30° C.

There is no specific limitation on the mixing of the perfluorodicarboxylic acid fluoride (A), cesium fluoride (CsF) and the aprotic polar solvent with stirring. For example, to CsF placed in a flask equipped with a stirrer, a mixed solution of the perfluorodicarboxylic acid fluoride (A) and the aprotic polar solvent is dropwise added with stirring the CsF in the flask. The temperature for the mixing is not specifically limited and is usually room temperature.

The starting point of the aging time (72 hours) is a point of time at which the polymerization initiator (B) is formed by the reaction caused by mixing the perfluorodicarboxylic acid fluoride (A), cesium fluoride (CsF) and the aprotic polar solvent with one another with stirring, and is specifically a point of time at which most of the —COF groups at the ends of molecules of the perfluorodicarboxylic acid fluoride (A) in the solution disappear. Presence of the —COF group at the molecular end can be confirmed by, for example, partly withdrawing a sample containing —COF from a reaction solution that is being stirred and measuring an integral value of F atom of the —COF contained in the sample by means of $^{19}$F-NMR.

For aging the resulting solution, a method of allowing the solution to stand still, a method of slowly stirring the solution, a method of applying ultrasonic wave to the solution or a method of combining these methods is available. Of these, the method of allowing the solution to stand still is preferable in the present invention. Although the aging time varies depending upon the aging method, a lapse of not less than 72 hours is necessary when the method of allowing the solution to stand still is used singly. In case of the method of slowly stirring the solution, the aging time depends upon the stirring efficiency, and when the number of stirring times is 20 times/min, a lapse of not less than about 16 hours is preferable. In case of the method of applying ultrasonic wave to the solution, the aging time depends upon the ultrasonic frequency, and when the ultrasonic frequency is about 45 kHz, a lapse of not less than about 2 hours is preferable.

In the present invention, when the perfluorodicarboxylic acid fluoride (A) is mixed with cesium fluoride (CsF) in the aprotic polar solvent with stirring, there is formed a polymerization initiator (B) represented by the following formula (II):

 (II)

wherein Rf is a perfluoroalkylene group having 1 to 4 carbon atoms or a perfluoroalkylene group having 2 to 10 carbon atoms and an ether bond.

In the later-described process for preparing a perfluoropolyether according to the invention, a perfluoropolyether can be obtained by polymerizing hexafluoropropylene oxide in the presence of the above-mentioned polymerization initiator-containing solution, and in the preparation of the polymerization initiator-containing solution, the reaction solution containing the polymerization initiator (B) is allowed to stand for not less than 72 hours at a temperature of 0 to 30° C., whereby a bifunctional perfluoropolyether can be obtained with high selectivity and high degree of polymerization. If the lapse of time is less than 72 hours, selectivity of the resulting bifunctional perfluoropolyether is lowered, and formation of a monofunctional perfluoropolyether is increased.

That is to say, when the perfluorodicarboxylic acid fluoride (A) is mixed with cesium fluoride (CsF) in the aprotic polar solvent with stirring, the reaction is promoted in several hours to form a polymerization initiator (B), and then the activity of the polymerization initiator-containing solution which contains the polymerization initiator (B) changes with the lapse of time, whereby selectivity of the bifunctional perfluoropolyether and degree of polymerization are enhanced.

This phenomenon is described below in more detail.

(1) The perfluorodicarboxylic acid fluoride (A) is mixed with cesium fluoride (CsF) with stirring, and after a lapse of a certain period of time, a peak of F of the —COF group at the end of the starting perfluorodicarboxylic acid fluoride (A) and a peak of F of the cesium fluoride (CsF) are not observed by $^{19}$F-NMR, and the reaction of the perfluorodicarboxylic acid fluoride (A) with cesium fluoride proceeds almost quantitatively.

(2) Each of FIGS. 1(a), 1(b), 1(c) and 1(d) shows a $^{19}$F-NMR spectrum of F atom of the —CF$_2$OCs group at the end of the polymerization initiator (B) and an integral value of the F atom. FIGS. 1(a), 1(b), 1(c) and 1(d) show integral values of the F atom of the CF$_2$OCs group at the end of the polymerization initiator (B) obtained after a lapse of 24 hours, a lapse of 48 hours, a lapse of 96 hours and a lapse of one month, respectively. As is clear from FIG. 1, the central positions of the peaks in FIGS. 1(a), 1(b), 1(c) and 1(d) are the same as each other, and the compounds formed with the lapse of time are the same as each other. That is to say, the polymerization initiator (B) is formed in each case.

(3) As shown in FIG. 1, the peak of the F atom in case of a lapse of 24 hours (FIG. 1(a)) or a lapse of 48 hours (FIG. 1(b)) is broad and the integral value is small, but the integral value of the F atom in case of a lapse of 96 hours (FIG. 1(c)) or a lapse of one month (FIG. 1(d)) increases noticeably.

When the half band width of the peak of the F atom in the $^{19}$F-NMR spectral chart is measured, marked differences are found as shown in Table 1.

TABLE 1

| Lapse of time | Half band width |
| --- | --- |
| 24 hours | 12 ppm |
| 48 hours | 9 ppm |
| 96 hours | 3 ppm |
| 30 days | 2 ppm |

That is to say, if the lapse of time exceeds 96 hours, the half band width decreases noticeably.

In comparison between polymerization reaction of hexafluoropropylene oxide using a polymerization initiator-containing solution (a) obtained after a lapse of 24 hours and that using a polymerization initiator-containing solution (c) obtained after a lapse of 96 hours, the degree of polymerization and the selectivity of a bifunctional perfluoropolyether are both low in case of the solution catalyst obtained after a lapse of 24 hours, while in case of the solution catalyst obtained after a lapse of 96 hours a bifunctional perfluoropolyether can be obtained with high degree of polymerization and high selectivity.

The phenomenon that the activity of the resulting polymerization initiator-containing solution changes with the lapse of time is presumably attributable to the following cause. That is, it is presumed that, for not more than a certain period of time immediately after synthesis of the polymerization initiator (B), solvation between the aprotic polar solvent and the polymerization initiator (B) does not proceed sufficiently, and the polymerization initiator (B) is in an associated cluster state. Hence, because of restraint due to the interaction between molecules of the polymerization initiator (B), the integral value of the F atom becomes broad, and the activity of the polymerization initiator (B) is hardly exhibited. It is also presumed that when a certain period of time passes after the reaction, salvation between the aprotic polar solvent and the polymerization initiator (B) proceeds to a considerable extent, and the association of the polymerization initiator (B) is loosened to allow the polymerization initiator (B) to be present in the solvent. Hence, the activity of the polymerization initiator (B) is apt to be exhibited.

After the mixing and stirring, the reaction solution obtained is allowed to stand at about room temperature, specifically a temperature of 0 to 30° C., preferably 10 to 20° C.

If the temperature exceeds 30° C., the polymerization initiator-containing solution loses activity, and in the later-described preparation of a perfluoropolyether, the selectivity of the resulting bifunctional perfluoropolyether and the degree of polymerization are sometimes lowered. If the reaction temperature is lower than 0° C., the rate of aging is lowered and the solution cannot be used practically.

The concentration of the polymerization initiator (B) in the polymerization initiator-containing solution is preferably not less than $4\times10^{-4}$ mol/g, more preferably 4 to 20 mol/g, particularly preferably 4 to 10 mol/g.

If the concentration is less than $4\times10^{-4}$ mol/g, solidification of the solvent is liable to take place when polymerization of the perfluorodicarboxylic acid fluoride (A) is conducted at a low temperature for the purpose of preventing chain transfer. Accordingly, it is unfavorable to conduct reaction of the perfluorodicarboxylic acid fluoride (A) with cesium fluoride (CsF) in the solution of a low concentration in order to reduce association of the polymerization initiator (B), because the polymerization initiator-containing solution does not function as a catalyst.

When the unreacted cesium fluoride is precipitated in the polymerization initiator-containing solution obtained after a lapse of a certain period of time, it is possible to remove the cesium fluoride or to dispense the supernatant from the polymerization initiator-containing solution.

Polymerization Initiator of the Second Invention and Process for Preparing Polymerization Initiator-containing Solution In the present invention, the perfluorodicarboxylic acid fluoride (A') represented by the formula (VI) is mixed with cesium fluoride (CsF) in the aprotic polar solvent with stirring, whereby there can be obtained a polymerization initiator-containing solution which contains a polymerization initiator (B') represented by the following formula (IV):

(FOC)$_x$—Rf$^2$—(CF$_2$OCs)$_y$           (IV)

wherein Rf$^2$ is perfluoroalkylene having 1 to 4 carbon atoms or perfluoroalkylene having 2 to 10 carbon atoms and an ether bond, and x and y are numbers satisfying the conditions of x+y=2 and 0.1<y<2.

In the later-described process for preparing a perfluoropolyether according to the invention, a perfluoropolyether can be obtained by polymerizing hexafluoropropylene oxide in the presence of the above-mentioned polymerization initiator-containing solution, and in the preparation of the polymerization initiator-containing solution, the perfluorodicarboxylic acid fluoride (A') is allowed to react with CsF in a specific ratio, whereby a polymerization initiator (B') for use in the invention can be formed. By the use of the polymerization initiator-containing solution, a bifunctional perfluoropolyether can be obtained with excellent selectivity and excellent degree of polymerization.

The mixing ratio (CsF/perfluorodicarboxylic acid fluoride (A'), by mol) of the cesium fluoride to the perfluorodicarboxylic acid fluoride (A') is preferably not less than 0.1 and less than 2, more preferably 0.3 to 1.8, particularly preferably 0.5 to 1.8.

One of the reasons why the chain transfer takes place to form a monofunctional perfluoropolyether as a by-product is an action of free $Cs^+F^-$ in the reaction system, so that by decreasing the amount of the free $Cs^+F^-$, a bifunctional perfluoropolyether can be obtained with high selectivity. Therefore, the ratio of CsF to FOCRf—COF needs to be less than 2, whereby occurrence of extra CsF can be avoided.

As the proportion of CsF becomes smaller, fluidity of the catalyst at low temperatures can be kept better, and it becomes feasible to enhance degree of polymerization and selectivity. To the contrary, when the proportion of CsF is too small, it becomes operationally difficult to eliminate influences of water, HF or the like included from the starting materials, and hence lowering of selectivity and degree of polymerization is brought about.

More specifically, if the mixing ratio is not less than 2, selectivity of the resulting bifunctional perfluoropolyether becomes bad, and formation of a monofunctional perfluoropolyether is sometimes increased.

If the mixing ratio is less than 0.1, the degree of polymerization and the selectivity of the bifunctional polyether are sometimes lowered because of chain transfer agents such as $H_2O$ and HF included from the starting materials or included in the handling process.

There is no specific limitation on the process for preparing the polymerization initiator-containing solution which contains the polymerization initiator (B'). For example, to CsF placed in a flask equipped with a stirrer, a mixed solution of the perfluorodicarboxylic acid fluoride (A') and the aprotic polar solvent is dropwise added with stirring the CsF in the flask. The temperature for the mixing is not specifically limited and is usually room temperature.

Formation of the —$CF_2OCs$ bond in the polymerization initiator (B') can be confirmed by observing the —COF group at the molecular end of the perfluorodicarboxylic acid fluoride (A') in the solution. For example, presence of the —COF group at the molecular end can be confirmed by partly withdrawing a sample containing —COF from a reaction solution that is being stirred and measuring an integral value of F atom of the —COF contained in the sample by means of $^{19}F$-NMR.

Specifically, the perfluorodicarboxylic acid fluoride (A') is mixed with cesium fluoride (CsF) with stirring, and after a lapse of a certain period of time, the amounts of the —COF groups at the ends of the starting perfluorodicarboxylic acid fluoride (A') are decreased, so that a peak of F of the cesium fluoride is not observed by $^{19}F$-NMR, and the reaction of the perfluorodicarboxylic acid fluoride (A') with cesium fluoride (CsF) proceeds almost quantitatively.

The concentration of the resulting polymerization initiator (B') in the polymerization initiator-containing solution is preferably not less than $4 \times 10^{-4}$ mol/g, more preferably $4 \times 10^{-4}$ to $20 \times 10^{-4}$ mol/g, particularly preferably $4 \times 10^{-4}$ to $10 \times 10^{-4}$ mol/g.

If the concentration is less than $4 \times 10^{-4}$ mol/g, solidification of the solvent is liable to take place when polymerization of the perfluorodicarboxylic acid fluoride (A') is conducted at a low temperature for the purpose of preventing chain transfer. Accordingly, it is unfavorable to conduct reaction of the perfluorodicarboxylic acid fluoride (A') with cesium fluoride (CsF) in the solution of a low concentration in order to reduce association of the polymerization initiator (B'), because the polymerization initiator-containing solution does not function as a catalyst.

Next, the process for preparing a perfluoropolyether according to the invention is described.

Process for Preparing Perfluoropolyether

The process for preparing a perfluoropolyether according to the first or the second invention comprises polymerizing hexafluoropropylene oxide (HFPO) in the presence of the polymerization initiator-containing solution which can be obtained as described above. More specifically, it is preferable to add hexafluoropropylene oxide (HFPO) to the polymerization initiator-containing solution which can be obtained by allowing the reaction solution to stand for a certain period of time as described above, to conduct polymerization of HFPO.

In the first invention, various HFPO polymers (C) represented by the following formula (VIII) can be obtained correspondingly to the type of the polymerization initiator (B) represented by the formula (II), as indicated by the following reaction formula.

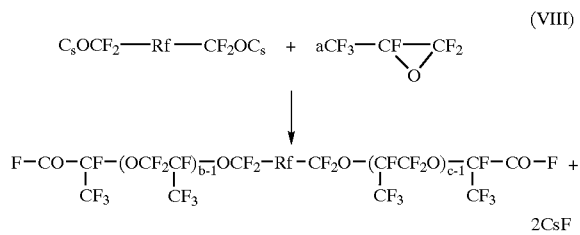

In the formula (VIII), Rf is a perfluoroalkylene group having 1 to 4 carbon atoms or a perfluoroalkylene group having 2 to 10 carbon atoms and an ether bond, and a=b+c.

In the second invention, various HFPO polymers (C') represented by the following formula (IX) can be obtained correspondingly to the type of the polymerization initiator (B') represented by the formula (IV), as indicated by the following reaction formula.

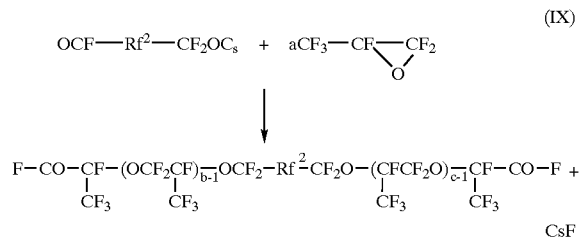

In the formula (IX), $Rf^2$ is a perfluoroalkylene group having 1 to 4 carbon atoms or a perfluoroalkylene group having 2 to 10 carbon atoms and an ether bond, and a=b+c.

In the first and the second inventions, the amount of the HFPO to be fed is properly determined, and the amount thereof is desired to be in the range of preferably 10 to 400 mol, more preferably 20 to 200 mol, based on 1 mol of the polymerization initiator (B) or (B') contained in the polymerization initiator-containing solution. The HFPO may be fed in any of gas state and liquid state.

The temperature of the mixed solution of the polymerization initiator-containing solution and HFPO is desired to be in the range of −35 to −40° C., preferably −33 to −38° C. It is preferable to mix them under the conditions by which the temperature is kept constant at a temperature in the above range. Although the feeding time is not specifically limited, it is preferably in the range of 3 to 120 hours.

The reaction temperature after the polymerization initiator-containing solution is mixed with HFPO is desired to be in the range of −30 to −50° C., preferably −35 to −40° C.

After the polymerization is completed, the internal temperature is maintained at a temperature of −40 to −30° C., preferably −35 to −40° C., and aging is conducted for about 1 to 10 hours, followed by raising the temperature. Thus, a perfluoropolyether represented by the formula (VIII) or (IX) can be obtained.

In the polymerization of HFPO in the presence of the polymerization initiator (B) or (B'), hexafluoropropylene may be further fed simultaneously with feeding of the HFPO. The hexafluoropropylene is desired to be fed in an amount of preferably 20 to 100% by weight, more preferably 30 to 90% by weight, based on the amount of the hexafluoropropylene oxide.

The polymerization initiator-containing solution of the invention is a solution catalyst which serves as a polymerization catalyst, can be in a liquid state even at a low temperature during the polymerization reaction, can be homogeneously dispersed in the polymerization reaction system and exhibits low chain transfer property and high activity. The process for preparing a perfluoropolyether according to the invention uses a special polymerization initiator-containing solution as a polymerization catalyst, and hence a bifunctional perfluoropolyether can be obtained with high degree of polymerization and high selectivity. Moreover, the polymerization initiator-containing solution is highly active, and hence, even if a small amount of a chain transfer substance is contained in the solution, a bifunctional perfluoropolyether can be obtained with high degree of polymerization and high selectivity.

EXAMPLE

The present invention is further described with reference to the following examples, but it should be construed that the invention is in no way limited to those examples.

The first invention is now described with reference to the following examples.

Catalyst Preparation Example A1

In a thoroughly dried 500 ml flask equipped with a dropping funnel, a condenser, a gas feed pipe and a stirrer, 9 g (59.2 mmol) of CsF having been calcined at 300° C. and then pulverized was placed. Then, 31.3 g of tetraglyme and 10.5 g (24.64 mmol) of F—CO—CCF$_3$F—OCF$_2$CF$_2$O—CFCF$_3$—CO—F were added at room temperature (20° C.) through the dropping funnel. After the dropwise addition was completed, the mixture was stirred at a temperature of 30° C. Then, stirring was continued, while presence of a —COF group at the end of the starting FOC—CF(CF$_3$)—OCF$_2$CF$_2$O—CF(CF$_3$)—COF in the reaction solution was confirmed by $^{19}$F-NMR. When the end —COF group disappeared, stirring was stopped. The reaction solution was allowed to stand still for one night (about 12 hours) at room temperature (20° C.), and then the unreacted CsF was removed. The reaction solution was further allowed to stand still for (a) 24 hours, (b) 48 hours, (c) 96 hours and (d) 30 days in total from the disappearance of the —COF group, to obtain catalyst solutions (a), (b), (c) and (d). From $^{19}$F-NMR and gas chromatography, it was confirmed that the reaction proceeded almost quantitatively. Calculation of the concentration of the polymerization initiator CsO—CF$_2$—CF(CF$_3$)—OCF$_2$CF$_2$O—CF(CF$_3$)—CF$_2$—OCs in the catalyst solution resulted in 5×10$^{-4}$ mol/l.

In FIGS. 1(a), 1(b), 1(c) and 1(d), $^{19}$F-NMR spectra and integral values of F atom of the end —CF$_2$—OCs of the products contained in the catalyst solutions (a), (b), (c) and (d) obtained by allowing the reaction solution to stand still for 24 hours, 48 hours, 96 hours and 30 days, respectively, are shown.

Catalyst Preparation Example A2

Mixing of the starting materials was carried out in the same manner as in Catalyst Preparation Example A1, except that 4.2 g (9.86 mmol) of F—CO—CCF$_3$F—OCF$_2$CF$_2$O—CFCF$_3$—CO—F was used in place of 10.5 g (24.64 mmol) of F—CO—CCF$_3$F—OCF$_2$CF$_2$O—CFCF$_3$—CO—F. When the end —COF group disappeared, stirring was stopped similarly to Catalyst Preparation Example A1. The reaction solution was allowed to stand still for one night (about 12 hours) at room temperature (20° C.), and then the unreacted CsF was removed. The reaction solution was further allowed to stand still for 24 hours in total from the disappearance of the —COF group, to obtain a catalyst solution (e). From $^{19}$F-NMR and gas chromatography, it was confirmed that the reaction proceeded almost quantitatively. Calculation of the concentration of the polymerization initiator CsO—CF$_2$—CF(CF$_3$)—OCF$_2$CF$_2$O—CF(CF$_3$)—CF$_2$—OCs in the catalyst solution resulted in 2×10$^{-4}$ mol/l.

Example A1

In a thoroughly dried 500 ml flask, 44.4 g (5×10$^{-4}$ mol/g) of the catalyst solution (c) prepared by allowing the reaction solution to stand still for 96 hours in Catalyst Preparation Example A1 was placed. Then, 12 g of hexafluoropropylene (HFP) was fed at room temperature, followed by stirring for 50 minutes. The mixed solution obtained was cooled to −38° C., and thereto was further added 18 g of HFP. To the solution, a mixed gas of 147 g of hexafluoropropylene oxide (HFPO) and 89 g of HFP was fed at a temperature of −38 to −32° C. over a period of 24 hours. After feeding of the mixed gas of HFPO and HFP was completed, stirring was further performed for 4 hours at the same temperature, then the temperature of the system was raised, and the unreacted HFP was recovered.

To the reaction solution, 500 g of methanol and 70 g of CF$_2$ClCFCl$_2$ were added, and they were stirred for 30 minutes. From the separated phases, the lower layer was dispensed, and the volatile component was distilled off at 120° C. and 1 mmHg to obtain 148 g of a mixed solution of a bifunctional perfluoropolyether represented by the following formula (A) and a monofunctional perfluoropolyether represented by the following formula (B).

(A)

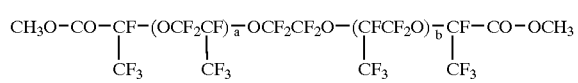

-continued

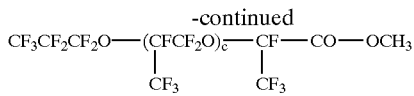

The results of $^{19}$F-NMR spectrometry of the mixed solution are shown in Table 2.

TABLE 2

| Chemical shift | Integral value | F for integral value *1 |
|---|---|---|
| −69.5 ppm | m = 5.43 | —OC$\underline{F}$CF$_2$— |
| −56.8 ppm | k = 0.26 | —C$\underline{F}$—CO— |
| −54.8 ppm | x = 0.037 | CF$_3$C$\underline{F}_2$CF$_2$O— |
| −5 to −8 ppm | n = 30.7 | C$\underline{F}_3$—, —OC$\underline{F}_2$CF— |

Remarks:
*1: The fluorine atom in the underlined portion is that to measure an integral value.

Using the above results, the following calculations were made, and as a result, the mean degree of polymerization was 39 and the selectivity (A)/(B) was 87/13.

Mean degree of polymerization: 2 m/(k+0.5x)=39

Selectivity: (100(k−0.5x)/(k+0.5x))/(100x/(k+0.5x))=87/13

Comparative Example A1

In a thoroughly dried 500 ml flask, 13.0 g (2×10$^{-4}$ mol/g) of the catalyst solution (e) prepared by allowing the reaction solution to stand still for 24 hours in Catalyst Preparation Example A2 was placed, followed by stirring at −35° C. for 15 minutes. Thereafter, 4 g of hexafluoropropylene (HFP) was fed, followed by stirring for about 60 minutes. The mixed solution obtained was cooled to −38° C., and to the solution, a mixed gas of 108 g of hexafluoropropylene oxide (HFEPO) and 54 g of HFP was fed at a temperature of −38 to −32° C. After about 30 minutes from beginning of feeding the mixed gas, the reaction solution solidified, and a perfluoropolyether was not obtained at all.

Comparative Example A2

In a thoroughly dried 500 ml flask, 20.0 g (5×10$^{-4}$ mol/g) of the catalyst solution (a) prepared by allowing the reaction solution to stand still for 24 hours in Catalyst Preparation Example A1 was placed, then cooled to −35° C. and stirred for 1 hour. Thereafter, 5 g of hexafluoropropylene (HFP) was fed, followed by stirring for 20 minutes at the same temperature. To the solution, 100.8 g of a mixed gas of 85.7 g of hexafluoropropylene oxide (HFPO) and 15.1 g of HFP was fed at a temperature of −38 to −32° C. over a period of 13 hours. After feeding of the mixed gas of HFPO and HFP was completed, stirring was further performed for 4 hours at the same temperature (−38 to −32° C.). After the reaction was completed, the cooled unreacted gas was distilled off under reduced pressure. Thereafter, to the reaction solution was added 100 g of methanol, followed by stirring for 10 minutes. From the separated phases, the lower layer was dispensed, and the volatile component was distilled off at 120° C. and 1 mmhg to obtain 42 g of a mixed solution of a bifunctional perfluoropolyether represented by the aforesaid formula (A) and a monofunctional perfluoropolyether represented by the aforesaid formula (B).

The results of $^{19}$F-NMR spectrometry of the mixed solution are shown in Table 3.

TABLE 3

| Chemical shift | Integral value | F for integral value *1 |
|---|---|---|
| −69.8 ppm | m = 35.56 | —OC$\underline{F}$CF$_2$— |
| −56.8 ppm | k = 4.94 | —C$\underline{F}$—CO— |
| −54.8 ppm | x = 3.20 | CF$_3$C$\underline{F}_2$CF$_2$O— |
| −5 to −8 ppm | n = 214.3 | C$\underline{F}_3$—, —OC$\underline{F}_2$CF |

Remarks:
*1: The fluorine atom in the underlined portion is that to measure an integral value.

Using the above results, the following calculations were made, and as a result, the mean degree of polymerization was 11 and the selectivity (A)/(B) was 51/49.

Mean degree of polymerization: 2 m/(k+0.5x)=11

Selectivity: (100(k−0.5x)/(k+0.5x))/(100x/(k+0.5x))=51/49

Next, the second invention is described with reference to the following examples.

Catalyst Preparation Example B1

Preparation of Catalyst Solution (a')

In a thoroughly dried 500 ml flask equipped with a dropping funnel, a condenser, a gas feed pipe and a stirrer, 4.8 g (31.6 mmol) of CsF having been calcined at 300° C. for 2 hours and then pulverized was placed. In the flask, the CsF was vacuum dried at 220° C. and 1 mmHg for 1 hour. Then, 45 g of tetraglyme and 13.5 g (31.6 mmol) of F—CO—C (CF$_3$) F—OCF$_2$CF$_2$O—CF (CF$_3$)—COF were added at room temperature (20° C.) through the dropping funnel. After the dropwise addition was completed, the mixture was stirred at a temperature of 30° C. Then, stirring was continued, while presence of a —COF group at the end of the starting FOC—CF(CF$_3$)—OCF$_2$CF$_2$O—CF(CF$_3$)—COF in the reaction solution was confirmed by $^{19}$F-NMR. When the amounts of the end —COF groups were reduced to half, stirring was stopped. The reaction solution was allowed to stand still for one night (about 12 hours) at room temperature (20° C.), and then the unreacted CsF was removed. Calculation of the concentration of the polymerization initiator CsO—CF$_2$—CF(CF$_3$)—OCF$_2$CF$_2$O—CF (CF$_3$)—CFO in the catalyst solution (a') resulted in 5×10$^{-4}$ mol/g, and calculation of the molar ratio (FOCRfCOF:CsF) between FOCRfCOF and CsF resulted in 1:1.

Catalyst Preparation Example B2

Preparation of Catalyst Solution (b')

Mixing of the starting materials was carried out in the same manner as in Catalyst Preparation Example B1, except that F—CO—CCF$_3$F—OCF$_2$CF$_2$O—CFCF$_3$—CO—F was used in an amount of 14.9 g (34.98 mmol) and CsF was used in an amount of 7.1 g (46.71 mmol). When the amounts of the end —COF groups were reduced, stirring was stopped similarly to Catalyst Preparation Example B1. The reaction solution was allowed to stand still for one night (about 12 hours) at room temperature (20°C.), and then the unreacted CsF was removed to obtain a catalyst solution (b'). Calculation of the concentration of the polymerization initiator (OCF)$_{0.5}$CF(CF$_3$)—OCF$_2$CF$_2$O—CF(CF$_3$)—(CF$_2$—OCs)$_{1.5}$ resulted in 5×10$^4$ mol/g, and calculation of the molar ratio (FOCRfCOF:CsF) between FOCRfCOF and CsF resulted in 1:1.5.

Catalyst Preparation Example B3

Preparation of Catalyst Solution (c')

A catalyst solution (c') was prepared in the same manner as in Catalyst Preparation Example B1, except that CsF was used in an amount of 6.8 g (43.3 mmol), FOCCF($CF_3$)$OCF_2CF_2OCF(CF_3)$COF was used in an amount of 10.5 g (26.64 mmol), and tetraglyme was used in an amount of 31.3 g.

Calculation of the concentration of the polymerization initiator $(FOC)_{0.25}CF(CF_3)OCF_2CF_2OCF(CF_3)$—$(CF_2OCs)_{1.75}$ resulted in $5 \times 10^{-4}$ mol/g, and calculation of the molar ratio (FOCRfCOF:CsF) between FOCRfCOF and CsF resulted in 1:1.75.

Catalyst Preparation Example B4

Preparation of Catalyst Solution (d')

A catalyst solution (d') was prepared in the same manner as in Catalyst Preparation Example B1, except that CsF was used in an amount of 2.9 g (19.0 mmol).

Calculation of the concentration of the polymerization initiator $(FOC)_{1.4}$—$CF(CF_3)OCF_2CF_2OCF(CF_3)$—$(CF_2-OCs)_{0.6}$ resulted in $5 \times 10^{-4}$ mol/g, and calculation of the molar ratio (FOCRfCOF:CsF) between FOCRfCOF and CsF resulted in 1:0.6.

Catalyst Preparation Example B5

Preparation of Catalyst Solution (e')

In a thoroughly dried 500 ml flask equipped with a dropping funnel, a condenser, a gas feed pipe and a stirrer, 9 g (59.2 mmol) of CsF having been calcined at 300° C. for 2 hours and then pulverized was placed. In the flask, the CsF was vacuum dried at 220° C. and 1 mmHg for 1 hour. Then, 31.3 g of tetraglyme and 4.2 g (19.86 mmol) of F—CO—C($CF_3$)F—$OCF_2CF_2O$—$CF(CF_3)$—CO—F were added at room temperature (20° C.) through the dropping funnel. After the dropwise addition was completed, the mixture was stirred at a temperature of 30° C. Then, stirring was continued, while presence of a —COF group at the end of the starting FOC—$CF(CF_3)$—$OCF_2CF_2O$—$CF(CF_3)$—COF in the reaction solution was confirmed by $^{19}$F-NMR. When the end —COF group disappeared, stirring was stopped. The reaction solution was allowed to stand still for one night (about 12 hours) at room temperature (20° C.), and then the unreacted CsF was removed. The reaction solution was further allowed to stand still for 24 hours in total from the disappearance of the end —COF group, to obtain a catalyst solution (e'). Calculation of the concentration of the polymerization initiator CsO—$CF_2$—$CF(CF_3)$—$OCF_2CF_2O$—$CF(CF_3)$—$CF_2$—OCs in the catalyst solution (e') resulted in $2 \times 10^{-4}$ mol/g, and calculation of the molar ratio (FOCRfCOF:CsF) between FOCRfCOF and CsF resulted in 1:6.

Catalyst Preparation Example B6

Preparation of Catalyst Solution (f)

In a thoroughly dried 500 ml flask equipped with a dropping funnel, a condenser, a gas feed pipe and a stirrer, 9 g (59.2 mmol) of CsF having been calcined at 300° C. for 2 hours and then pulverized was placed. In the flask, the CsF was vacuum dried at 220° C. and 1 mmHg for 1 hour. Then, 31.3 g of tetraglyme and 10.5 g (24.64 mmol) of F—CO—C($CF_3$) F—$OCF_2CF_2O$—CF ($CF_3$)—CO—F were added at room temperature (20° C.) through the dropping funnel. After the dropwise addition was completed, the mixture was stirred at a temperature of 30° C. Then, stirring was continued, while presence of a —COF group at the end of the starting FOC—CF ($CF_3$)—$OCF_2CF_2O$ —$CF(CF_3)$—COF in the reaction solution was confirmed by $^{19}$F-NMR. When the end —COF group disappeared, stirring was stopped. The reaction solution was allowed to stand still for one night (about 12 hours) at room temperature (20° C.), and then the unreacted CsF was removed. The reaction solution was further allowed to stand still for 24 hours in total from the disappearance of the —COF group, to obtain a catalyst solution (f). Calculation of the concentration of the polymerization initiator CsO—$CF_2$—$CF(CF_3)$—$OCF_2CF_2O$—$CF(CF_3)$—$CF_2$—OCs in the catalyst solution (f) resulted in $5 \times 10^{-4}$ mol/g, and calculation of the molar ratio (FOCRfCOF:CsF) between FOCRfCOF and CsF resulted in 1:2.4.

Example B1

In a thoroughly dried 500 ml flask, 43.5 g ($5 \times 10^{-4}$ mol/g) of the catalyst solution (a') prepared in Catalyst Preparation Example B1 was placed. Thereafter, 12 g of hexafluoropropylene (HFP) was fed at room temperature, followed by stirring for 50 minutes. The mixed solution obtained was cooled to −35° C., and thereto was further added 12 g of HFP. Into the solution, a mixed gas of 135 g of hexafluoropropylene oxide (HFPO) and 87 g of HFP was injected at a temperature of —35 to −32° C. over a period of 17 hours. After feeding of the mixed gas of HFPO and HFP was completed, stirring was further performed for 1 hour at the same temperature, then the temperature of the system was raised, and the unreacted HFP was recovered.

To the reaction solution, 300 g of methanol and 88 g of $CF_2ClCFCl_2$ were added, and they were stirred for 30 minutes. From the separated phases, the lower layer was dispensed, and the volatile component was distilled off at 120° C. and 1 mmHg to obtain 115 g of a mixed solution of a bifunctional perfluoropolyether represented by the following formula (A) and a monofunctional perfluoropolyether represented by the following formula (B).

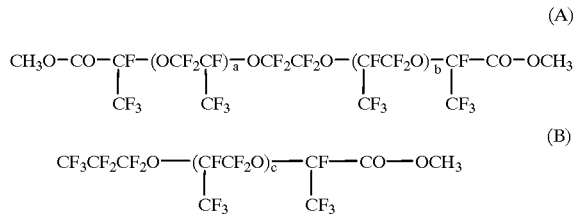

The results of $^{19}$F-NMR spectrometry of the mixed solution are shown in Table 4.

TABLE 4

| Chemical shift | Integral value | F for integral value |
|---|---|---|
| −69.8 ppm | m = 29.854 | —O$CF$$_2$— |
| −56.8 ppm | k = 1.502 | —CF—CO— |
| −54.8 ppm | x = 0.075 | $CF_3CF_2CF_2O$— |
| −5 to −8 ppm | n = 163.05 | $CF_3$—, $OCF_2$CF— |

Using the above results, the following calculations were made, and as a result, the mean degree of polymerization was 38.8 and the selectivity (A)/(B) was 95/5.

Mean degree of polymerization: 2 m/(k+0.5x)=38.8

Selectivity: (100(k−0.5x)/(k+0.5x))/(100x/(k+0.5x))=95/5

Example B2

In a thoroughly dried 500 ml flask, 38.8 g ($5\times10^{-4}$ mol/g) of the catalyst solution (b') prepared in Catalyst Preparation Example B2 was placed. Thereafter, 10 g of hexafluoropropylene (HFP) was fed at room temperature, followed by stirring for 40 minutes. The mixed solution obtained was cooled to −35° C., and thereto was further added 11 g of HFP. Into the solution, a mixed gas of 114 g of hexafluoropropylene oxide (HFPO) and 65 g of HFP was injected at a temperature of −35 to −32° C. over a period of 20 hours. After feeding of the mixed gas of HFPO and HFP was completed, stirring was further performed for 1 hour at the same temperature, then the temperature of the system was raised, and the unreacted HFP was recovered.

To the reaction solution, 300 g of methanol and 88 g of $CF_2ClCFCl_2$ were added, and they were stirred for 30 minutes. From the separated phases, the lower layer was dispensed, and the volatile component was distilled off at 120° C. and 1 mmHg to obtain 122 g of a mixed solution of a bifunctional perfluoropolyether represented by the following formula (A) and a monofunctional perfluoropolyether represented by the following formula (B).

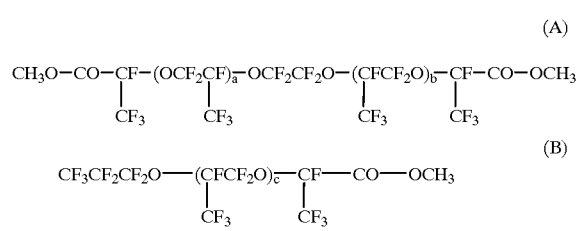

The results of $^{19}$F-NMR spectrometry of the mixed solution are shown in Table 5.

TABLE 5

| Chemical shift | Integral value | F for integral value |
|---|---|---|
| −69.8 ppm | m = 9.66 | —OC$\underline{F}$CF$_2$— |
| −56.8 ppm | k = 0.45 | —CF—CO— |
| −54.8 ppm | x = 0.052 | CF$_3$C$\underline{F}_2$CF$_2$O— |
| −5 to −8 ppm | n = 55.33 | C$\underline{F}_3$—, OC$\underline{F}_2$CF— |

Using the above results, the following calculations were made, and as a result, the mean degree of polymerization was 40.7 and the selectivity (A)/(B) was 89/11.

Mean degree of polymerization: 2 m/(k+0.5x)=40.7

Selectivity:(100(k−0.5x)/(k+0.5x))/(100x/(k+0.5x))=89/11

Example B3

In a thoroughly dried 500 ml flask, 27.7 g ($5\times10^{-4}$ mol/g) of the catalyst solution (c') prepared in Catalyst Preparation Example B3 was placed. Thereafter, 12 g of hexafluoropropylene (HFP) was fed at room temperature, followed by stirring for 60 minutes. The mixed solution obtained was cooled to −35° C., and thereto was further added 12 g of HFP. Into the solution, a mixed gas of 92 g of hexafluoropropylene oxide (HFPO) and 32 g of HFP was injected at a temperature of −35 to −32° C. over a period of 14 hours. After feeding of the mixed gas of HFPO and HFP was completed, stirring was further performed for 1 hour at the same temperature, then the temperature of the system was raised, and the unreacted HFP was recovered.

To the reaction solution, 300 g of methanol and 70 g of $CF_2ClCFCl_2$ were added, and they were stirred for 30 minutes. From the separated phases, the lower layer was dispensed, and the volatile component was distilled off at 120° C. and 1 mmHg to obtain 95 g of a mixed solution of a bifunctional perfluoropolyether represented by the following formula (A) and a monofunctional perfluoropolyether represented by the following formula (B).

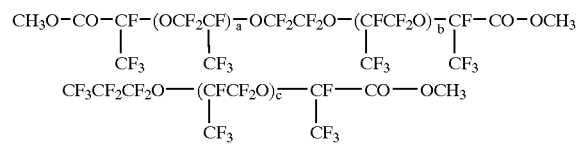

The results of $^{19}$F-NMR spectrometry of the mixed solution are shown in Table 6.

TABLE 6

| Chemical shift | Integral value | F for integral value |
|---|---|---|
| −69.8 ppm | m = 9.81 | —OC$\underline{F}$CF$_2$— |
| −56.8 ppm | k = 0.44 | —CF—CO— |
| −54.8 ppm | x = 0.04 | CF$_3$C$\underline{F}_2$CF$_2$O— |
| −5 to −8 ppm | n = 52.59 | C$\underline{F}_3$—, —OC$\underline{F}_2$CF— |

Using the above results, the following calculations were made, and as a result, the mean degree of polymerization was 42.7 and the selectivity (A)/(B) was 91/9.

Mean degree of polymerization: 2 m/(k+0.5x)=42.7

Selectivity: (100(k−0.5x)/(k+0.5x))/(100x/(k+0.5x))=91/9

Example B4

In a thoroughly dried 500 ml flask, 42.5g ($5\times10^{-4}$ mol/g) of the catalyst solution (d') prepared in Catalyst Preparation Example B4 was placed. Thereafter, 12 g of hexafluoropropylene (HFP) was fed at room temperature, followed by stirring for 60 minutes. The mixed solution obtained was cooled to −35° C., and thereto was further added 12 g of HFP. Into the solution, a mixed gas of 126 g of hexafluoropropylene oxide (HFPO) and 91 g of HFP was injected at a temperature of −35 to −32° C. over a period of 26 hours. After feeding of the mixed gas of HFPO and HFP was completed, stirring was further performed for 1 hour at the same temperature, then the temperature of the system was raised, and the unreacted HFP was recovered.

To the reaction solution, 300 g of methanol and 88 g of $CF_2ClCFCl_2$ were added, and they were stirred for 30 minutes. From the separated phases, the lower layer was dispensed, and the volatile component was distilled off at 120° C. and 1 mmHg to obtain 97 g of a mixed solution of a bifunctional perfluoropolyether represented by the following formula (A) and a monofunctional perfluoropolyether represented by the following formula (B).

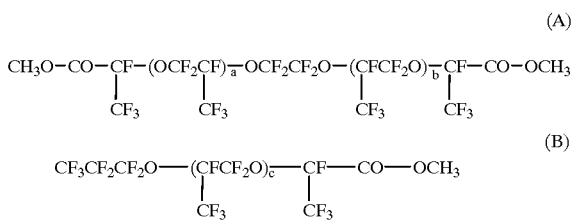

The results of $^{19}$F-NMR spectrometry of the mixed solution are shown in Table 7.

TABLE 7

| Chemical shift | Integral value | F for integral value |
|---|---|---|
| −69.8 ppm | m = 19.62 | —OC$\underline{F}$CF$_2$— |
| −56.8 ppm | k = 0.91 | —C$\underline{F}$—CO— |
| −54.8 ppm | x = 0.07 | CF$_3$C$\underline{F}_2$CF$_2$O— |
| −5 to −8 ppm | n = 105.18 | C$\underline{F}_3$—, OC$\underline{F}_2$CF— |

Using the above results, the following calculations were made, and as a result, the mean degree of polymerization was 41.5 and the selectivity (A)/(B) was 92/8.

Mean degree of polymerization: 2 m/(k+0.5x)=41.5

Selectivity:(100(k−0.5—)/(k+0.5x))/(100x/(k+0.5x))=92/8

Comparative Example B1

In a thoroughly dried 500 ml flask, 13.0 g (2×10$^{-4}$ mol/g) of the catalyst solution (e') prepared in Catalyst Preparation Example B5 was placed, followed by stirring at −35° C. for 15 minutes. Then, 4 g of hexafluoropropylene (HFF) was fed, followed by stirring for about 60 minutes. The mixed solution obtained was cooled to −38° C., and to the solution, a mixed gas of 108 g of hexafluoropropylene oxide (HFPO) and 54 g of HFP was fed at a temperature of −38 to −32° C. After about 30 minutes from beginning of feeding the mixed gas, the reaction solution solidified, and a perfluoropolyether was not obtained at all.

Comparative Example B2

In a thoroughly dried 500 ml flask, 20.0 g (5×10$^{-4}$ mol/g) of the catalyst solution (f) prepared in Catalyst Preparation Example B6 was placed, then cooled to −35° C. and stirred for 1 hour. Thereafter, 5 g of hexafluoropropylene (HFP) was fed, followed by stirring for 20 minutes at the same temperature. To the solution, 100.8 g of a mixed gas of 85.7 g of hexafluoropropylene oxide (HFPO) and 15.1 g of HFP was fed at a temperature of −38 to −32° C. over a period of 13 hours. After feeding of the mixed gas of HFPO and HFP was completed, stirring was further performed for 4 hours at the same temperature (−38 to −32° C.). After the reaction was completed, the cooled unreacted gas was distilled off under reduced pressure. Thereafter, to the reaction solution was added 100 g of methanol, followed by stirring for 10 minutes. From the separated phases, the lower layer was dispensed, and the volatile component was distilled off at 120° C. and 1 mmHg to obtain 42 g of a mixed solution of a bifunctional perfluoropolyether represented by the aforesaid formula (A) and a monofunctional perfluoropolyether represented by the aforesaid formula (B).

The results of $^{19}$F-NMR spectrometry of the mixed solution are shown in Table 8.

TABLE 8

| Chemical shift | Integral value | F for integral value |
|---|---|---|
| −69.8 ppm | m = 35.56 | —OC$\underline{F}$CF$_2$— |
| −56.8 ppm | k = 4.94 | —C$\underline{F}$—CO— |
| −54.8 ppm | x = 3.20 | CF$_3$C$\underline{F}_2$CF$_2$O— |
| −5 to −8 ppm | n = 214.3 | C$\underline{F}_3$—, OC$\underline{F}_2$CF— |

Using the above results, the following calculations were made, and as a result, the mean degree of polymerization was 11 and the selectivity (A)/(B) was 51/49.

Mean degree of polymerization: 2 m/(k+0.5x)=11

Selectivity:(100(k−0.5x)/(k+0.5x))/(100x/(k+0.5x))=51/49

What is claimed is:

1. A process for preparing a perfluoropolyether, comprising polymerizing hexafluoropropylene oxide in the presence of a polymerization initiator-containing solution which comprises a polymerization initiator (B') represented by the following formula (IV) and an aprotic polar solvent;

$$(FOC)_x—Rf^2—(CF_2OCs)_y \quad (IV)$$

wherein Rf$^2$ is perfluoroalkylene having 1 to 4 carbon atoms or perfluoroalkylene having 2 to 10 carbon atoms and an ether bond, and x and y are numbers satisfying the conditions of x+y=2 and 0.1<y<2.

2. The process for preparing a perfluoropolyether as claimed in claim 1, wherein Rf$^2$ in the formula (IV) is represented by the following formula (V):

wherein Rf$^3$ is perfluoroalkylene having 2 to 6 carbon atoms.

3. The process for preparing a perfluoropolyether as claimed in claim 1, wherein the concentration of the polymerization initiator (B') in the polymerization initiator-containing solution is not less than 4×10$^{-4}$ mol/g.

4. The process for preparing a perfluoropolyether as claimed in claim 1, wherein the polymerization initiator (B') is a compound obtained by allowing a perfluorodicarboxylic acid fluoride (A') represented by the following formula (VI) to react with CsF in an aprotic polar solvent;

$$FOC—Rf^4—COF \quad (VI)$$

wherein Rf$^4$ is a perfluoroalkylene group having 1 to 4 carbon atoms or a perfluoroalkylene group having 2 to 10 carbon atoms and an ether bond.

5. The process for preparing a perfluoropolyether as claimed in claim 4, wherein the perfluorodicarboxylic acid fluoride (A') is represented by the following formula (VII):

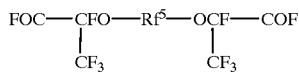 (VII)

wherein $Rf^5$ is a perfluoroalkylene group having 2 to 4 carbon atoms.

6. The process for preparing a perfluoropolyether as claimed in claim 4, wherein the molar ratio (CsF/perfluorodicarboxylic acid fluoride (A')) of the CsF to the perfluorodicarboxylic acid fluoride (A') used is not less than 0.1 and less than 2.

7. The process for preparing a perfluoropolyether as claimed in claim 1, wherein polymerization of the hexafluoropropylene oxide is carried out at a temperature of not higher than $-30°$ C.

8. The process for preparing a perfluoropolyether as claimed in claim 2, wherein the concentration of the polymerization initiator (B') in the polymerization initiator-containing solution is not less than $4\times10^{-4}$ mol/g.

9. The process for preparing a perfluoroether as claimed in claim 7, wherein the concentration of the polymerization initiator (B') in the polymerization initiator-containing solution is not less than $4\times10^{-4}$ mol/g.

10. The process for preparing a perfluoropolyether as claimed in claim 1 wherein, in the polymerization of the hexafluoropropylene oxide, hexafluoropropylene is further used in combination in an amount of 20 to 50% by weight based on the amount of the hexafluoropropylene oxide.

11. The process for preparing a perfluoropolyether as claimed in claim 2, wherein the polymerization initiator (B') is a compound obtained by allowing a perfluorodicarboxylic acid fluoride (A') represented by the following formula (VI) to react with CsF in an aprotic polar solvent:

FOC—Rf$^4$—COF (VI)

wherein $Rf^4$ is a perfluoroalkylene group having 1 to 4 carbon atoms or a perfluoroalkylene group having 2 to 10 carbon atoms and an ether bond.

12. The process for preparing a perfluoropolyether as claimed in claim 7, wherein the polymerization initiator (B') is a compound obtained by allowing a perfluorodicarboxylic acid fluoride (A') represented by the following formula (VI) to react with CsF in an aprotic polar solvent:

FOC—Rf$^4$—COF (VI)

wherein $Rf^4$ is a perfluoroalkylene group having 1 to 4 carbon atoms or a perfluoroalkylene group having 2 to 10 carbon atoms and an ether bond.

13. The process for preparing a perfluoropolyether as claimed in claim 3, wherein the polymerization initiator (B') is a compound obtained by allowing a perfluorodicarboxylic acid fluoride (A') represented by the following formula (VI) to react with CsF in an aprotic polar solvent:

FOC—Rf$^4$—COF (VI)

wherein $Rf^4$ is a perfluoroalkylene group having 1 to 4 carbon atoms or a perfluoroalkylene group having 2 to 10 carbon atoms and an ether bond.

14. The process for preparing a perfluoropolyether as claimed in claim 10, wherein the polymerization initiator (B') is a compound obtained by allowing a perfluorodicarboxylic acid fluoride (A') represented by the following formula (VI) to react with CsF in an aprotic polar solvent;

FOC—Rf$^4$—COF (VI)

wherein $Rf^4$ is perfluoroalkylene group having 1 to 4 carbon atoms or perfluoroalkylene group having 2 to 10 carbon atoms and an ether bond.

15. The process for preparing a perfluoropolyether as claimed in claim 5, wherein the molar ratio (CsF/perfluorodicarboxylic acid fluoride (A')) of the CsF to the perfluorodicarboxylic acid fluoride (A') used is not less than 0.1 and less than 2.

16. The process for preparing a perfluoropolyether as claimed in claim 1, wherein the aprotic polar solvent is diglyme, triglyme, tetraglyme or sulfolane.

17. The process for preparing a perfluoropolyether as claimed in claim 1, comprising polymerizing hexafluoropropylene oxide in the presence of a polymerization initiator-containing solution which comprises a polymerization initiator (B') represented by the following formula (IV) and an aprotic polar solvent;

(FOC)$_x$—Rf$^2$—(CF$_2$OCs)$_y$ (IV)

wherein $Rf^2$ is a perfluoroalkylene group having 1 to 4 carbon atoms or a perfluoroalkylene group having 2 to 10 carbon atoms and an ether bond, and x and y are numbers satisfying the conditions of x+y=2 and 0.1<y<1.8.

* * * * *

UNITED STATES PATENT AND TRADEMARK OFFICE
CERTIFICATE OF CORRECTION

PATENT NO.   : 6,469,217 B2  
DATED        : October 22, 2002  
INVENTOR(S)  : Satoru Saito et al.

It is certified that error appears in the above-identified patent and that said Letters Patent is hereby corrected as shown below:

Title page,  
Item [56], References Cited, U.S. PATENT DOCUMENTS, insert:  
-- 5,919,973  A            Matsuda et al....................... 560/184 --  
FOREIGN PATENT DOCUMENTS, insert:  
-- 0947533      10/1999        European Patent Office  
   0947534      10/1999        European Patent Office --

Column 15,  
Line 38, "(HFEPO)" should read -- (HFPO) --.  
Line 62, "and 1 mmhg" should read -- and 1 mmHg --.

Column 16,  
Table 3, last column, last row, insert hyphen (-) at end of value.

Column 21,  
Table 7, last column, last row, insert hyphen (-) at end of value.  
Line 33, "Selectivity: (100(k-0.5—)" should read -- Selectivity: (100(k-0.5x) --.  
Line 40, "(HFF)" should read -- (HFP) --.

Signed and Sealed this

Third Day of June, 2003

JAMES E. ROGAN  
*Director of the United States Patent and Trademark Office*